United States Patent
Yoda et al.

(10) Patent No.: US 12,257,754 B2
(45) Date of Patent: Mar. 25, 2025

(54) MOLD-CLAMPING MACHINE

(71) Applicant: NISSEI PLASTIC INDUSTRIAL CO., LTD., Nagano (JP)

(72) Inventors: Hozumi Yoda, Nagano (JP); Satoshi Hoshino, Nagano (JP); Atsushi Murata, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 724 days.

(21) Appl. No.: 17/423,225

(22) PCT Filed: Feb. 14, 2020

(86) PCT No.: PCT/JP2020/005682
§ 371 (c)(1),
(2) Date: Jul. 15, 2021

(87) PCT Pub. No.: WO2020/175166
PCT Pub. Date: Sep. 3, 2020

(65) Prior Publication Data
US 2022/0063164 A1  Mar. 3, 2022

(30) Foreign Application Priority Data
Feb. 25, 2019  (JP) ................. 2019-031757

(51) Int. Cl.
*B29C 45/64* (2006.01)
*H01F 7/02* (2006.01)

(52) U.S. Cl.
CPC ............. *B29C 45/64* (2013.01); *H01F 7/02* (2013.01); *B29C 2045/645* (2013.01); *B29K 2905/00* (2013.01)

(58) Field of Classification Search
CPC ........ B29C 2045/645; B29C 2045/647; B29C 45/64; B29C 2046/645; B29C 2045/1746; B29C 2045/1776
See application file for complete search history.

(56) References Cited

U.S. PATENT DOCUMENTS

| 2008/0187771 | A1* | 8/2008 | Schad | B29C 45/6728 |
| | | | | 425/450.1 |
| 2009/0324762 | A1* | 12/2009 | Moritani | B29C 45/64 |
| | | | | 425/3 |
| 2012/0269917 | A1* | 10/2012 | Miyatake | B29C 45/68 |
| | | | | 425/589 |

OTHER PUBLICATIONS

International Search Report mailed on Apr. 14, 2020 in International Application No. PCT/JP2020/005682 together with English-language machine translation.
(Continued)

*Primary Examiner* — Thu Khanh T. Nguyen
(74) *Attorney, Agent, or Firm* — ADAMS & WILKS (57) ABSTRACT

A mold clamping machine includes a stationary mount, a movable mount, a mold-clamping mechanism and a mold opening and-closing mechanism. The mold-clamping mechanism includes a cylindrical constraining mechanism and has a magnet mechanism built therein. By causing a current to flow or not flow, the constraining mechanism changes to an unconstrained state or to a constraining state. In the unconstrained state, the mold clamping mechanism is movable relative to and along a tie bar. In the constrained state, the mold clamping mechanism becomes unmovable relative to the tie bar. The magnet mechanism positions the mold-clamping mechanism at any desired arbitrary position along the tie bar.

12 Claims, 7 Drawing Sheets

(56) References Cited

OTHER PUBLICATIONS

English-language machine translation of Publication No. JP2001-315130, published Nov. 13, 2001.
English-language machine translation of Publication No. KR20030043289, published Jun. 2, 2003.
English-language machine translation of Publication No. JP2017-121797, published Jul. 13, 2017.
English-language machine translation of Publication No. JP2018-001473, published Jan. 11, 2018.
English-language machine translation of Publication No. KR20180045683, published May 4, 2018.

\* cited by examiner

FIG.3

FIG.4A
UNCONSTRAINED STATE

FIG.4B
CONSTRAINED STATE

PRIOR ART
FIG. 7

MOLD-CLAMPING MACHINE

TECHNICAL FIELD

The present disclosure relates to a mold-clamping machine that clamps a metal mold.

BACKGROUND ART

Obtaining a resin molded component by injecting a melted resin in the cavity of a metal mold and by causing such a resin to cure is well-practiced in the industries. The metal mold includes a stationary mold and a movable mold, and mold clamping is executed by a mold-clamping machine.

A mold-clamping machine that includes half nuts is conventionally known (see, for example, Patent Documents 1 (FIG. 1)).

Patent Document 1 will be described with reference to the following figure.

Figure 7:
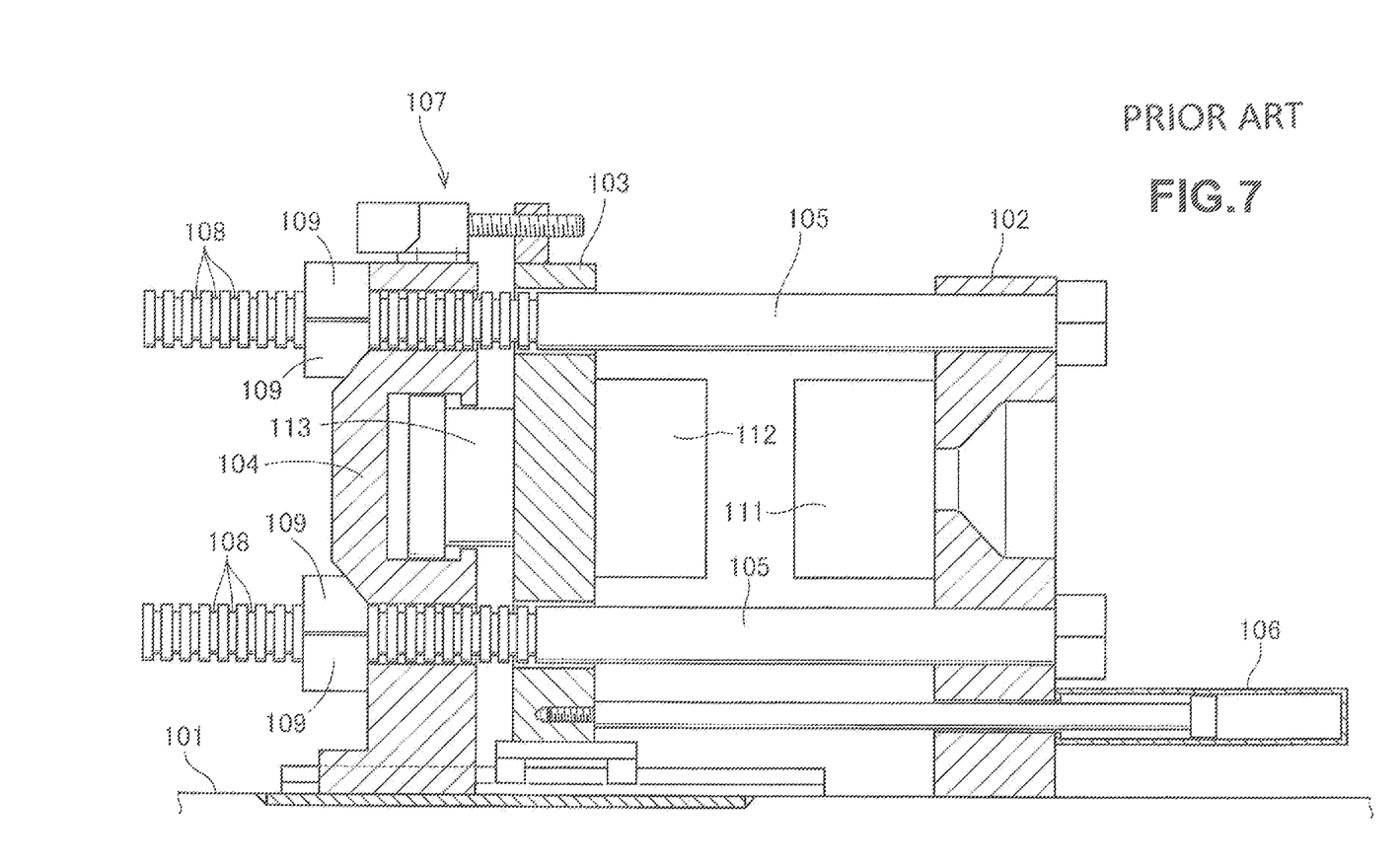
FIG. 7 is a side view illustrating a conventional mold-clamping machine.

FIG. 7 is a diagram for describing the basic structure of a conventional mold-clamping machine. A stationary mount 102 is fastened to a base 101, and a movable mount 103 and a mold-clamping mechanism 104 are placed so as to be movable in the axial direction of tie bars 105.

The stationary mount 102 and the movable mount 103 are coupled by a mold opening-and-closing mechanism 106, and the movable mount 103 and the mold-clamping mechanism 104 are coupled by a coupling mechanism 107.

A plurality of circumferential grooves 108 are provided in each tie bar 105 at an equal pitch and at necessary portions.

Half nuts 109 each having a thread to be engaged with each circumferential groove 108 are attached to the mold-clamping mechanism 104 so as to be movable up and down. The upper and lower half nuts 109 are a set which is engaged with the respective circumferential grooves 108 by coming close (closed) to each other, and which is disengaged by moving apart (opened) from each other.

In the figure, a stationary mold 111 attached to the stationary mount 102 and a movable mold 112 attached to the movable mount 103 are separated from each other, and thus the metal mold is in an opened state.

When the half nuts 109 are opened and the mold opening-and-closing mechanism 106 is compressed, the movable mold 112 abuts the stationary mold 111.

When the circumferential groove 108 of the tie bar 105 and the thread of the half nut 109 are displaced, the mold-clamping mechanism 104 is slightly moved with reference to the movable mount 103 by the coupling mechanism 107 until the thread of the half nut 109 is aligned with the circumferential groove 108.

When aligned, the half nut 109 is closed. Next, mold clamping is executed by a piston 113.

Large force is applied to each half nut 109 in this mold clamping operation. Each circumferential groove 108 is formed at a certain size of pitch so as to withstand against such force. This is because if the pitch is too small, the distance between the adjoining circumferential grooves 108 and 108 becomes thin, and thus the rigidity against axial force becomes insufficient.

If the pitch is large, the rigidity can be secured. In contrast, this makes it difficult for the mold-clamping mechanism 104 to be precisely positioned.

Although accomplishment of the enhanced performance of a mold-clamping machine is being desired, it is desirable to position the mold-clamping mechanism at an arbitrary position.

CITATION LIST

Patent Literatures

Patent Document 1: JP 2018-001473 A

SUMMARY OF INVENTION

Technical Problem

An objective of the present disclosure is to provide a mold-clamping machine capable of positioning a mold-clamping mechanism at an arbitrary position.

Solution to Problem

A mold clamping machine according to one aspect of the invention includes:

a stationary mount which is fastened to a base and which supports a stationary mold;

a movable mount which is mounted on the base so as to be movable, and which supports a movable mold;

a mold-clamping mechanism which is placed outwardly relative to the movable mount, is mounted on the base so as to be movable, and clamps the movable mold with the stationary mold;

a tie bar that extends so as to pass completely through at least the movable mount; and a mold opening and closing mechanism that moves either one of the movable mount or the mold-clamping mechanism along the tie bar relative to the stationary mount, wherein the mold clamping machine further includes a constraining mechanism that causes either one of the mold clamping mechanism or the stationary mount to be in a constrained state relative to the tie bar, and wherein the constraining mechanism includes a magnet mechanism that changes either one of the mold-clamping mechanism or the stationary mount to be in the constrained state or in an unconstrained state relative to the tie bar.

According to another aspect of the invention, preferably, a predetermined distance is maintained between the constraining mechanism and the tie bar.

According to a further aspect of the invention, preferably, the magnet mechanism includes a first permanent magnet; an electro-magnetic coil that controls a polarity of the first permanent magnet; and a second permanent magnet.

According to another aspect of the invention, preferably, the constraining mechanism includes a cylindrical portion which encircles the tie bar, extends from the mold clamping mechanism so as to pass completely through the movable mount, and has a tip protruding from the movable mount toward the stationary mount.

According to a still further aspect of the invention, preferably, the constraining mechanism includes a cylindrical portion which encircles the tie bar, extends so as to pass completely through the stationary mount, and has a tip protruding from the stationary mount toward an injection apparatus.

Advantageous Effects of Invention

According to one aspect of the invention, the magnet mechanism causes the mold clamping mechanism to be in the constrained state relative to the tie bar, and thus the mold clamping mechanism can be constrained at an arbitrary position relative to the tie bar.

That is, according to the present disclosure, a mold clamping machine capable of positioning a mold-clamping mechanism at an arbitrary position is provided.

According to another aspect of the invention, the predetermined distance is maintained between the constraining mechanism and the tie bar. The constraining mechanism does not contact the tie bar, and thus a scratch or wear is not likely to occur on both the constraining mechanism and the tie bar According to a further aspect of the invention, the magnet mechanism includes the first permanent magnet, the electro magnetic coil that controls the polarity of the first permanent magnet, and the second permanent magnet. The polarity of the first permanent magnet is changed so as to accomplish the constrained state or the unconstrained state by causing a current to flow through the electro magnetic coil within a quite short time. The quite short time is less than one second. Since it is unnecessary to cause the current to flow in the other times, the electrical energy consumption can be reduced, and thus electricity expenses can be remarkably reduced.

According to another aspect of the invention, the constraining mechanism includes the cylindrical portion which extends from the mold-clamping mechanism so as to pass completely through the movable mount, and which has a tip protruding from the movable mount toward the stationary mount. Since the cylindrical portion can be sufficiently elongated, and the area for placing the permanent magnet can be increased, magnetic force necessary for the constraint can be easily ensured. Alternatively, since the area for placing the permanent magnet can be increased, a magnet that has a small magnetic flux density can be adopted. The magnet that has a small magnetic flux density is inexpensive and is easy to obtain.

According to a still further aspect of the invention, the constraining mechanism includes the cylindrical portion which extends so as to pass completely through the stationary mount, and has a tip protruding from the stationary mount toward an injection apparatus. Since the cylindrical portion can be sufficiently elongated, and the area for placing the permanent magnet can be increased, magnetic force necessary for the constraint can be easily ensured. Alternatively, since the area for placing the permanent magnet can be increased, a magnet that has a small magnetic flux density can be adopted. The magnet that has a small magnetic flux density is inexpensive and is easy to obtain.

DESCRIPTION OF EMBODIMENTS

Embodiments of the present disclosure will be described below with reference to the accompanying drawings.

Embodiments

Figure 1:
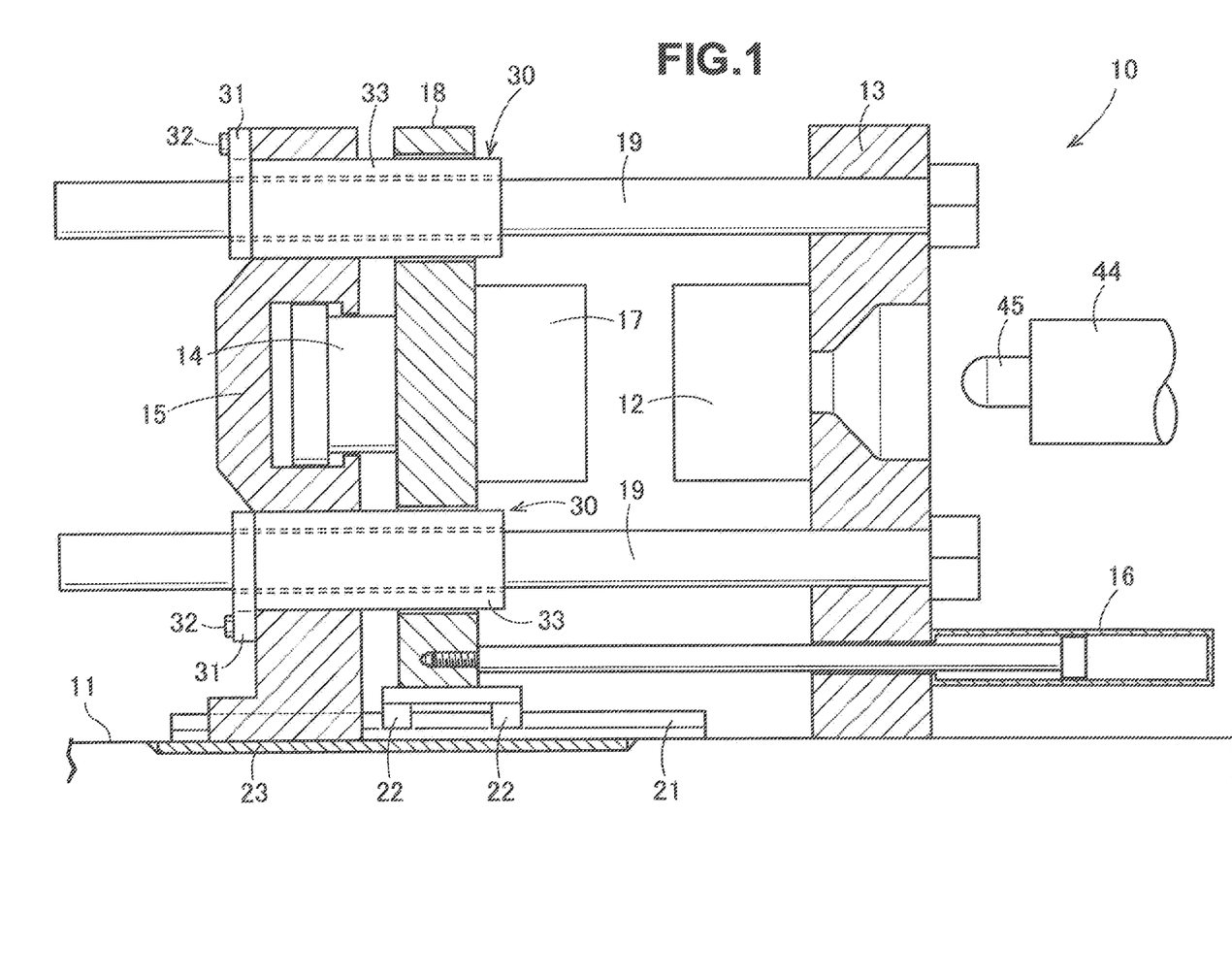
FIG. 1 is a side view of a mold-clamping machine according to the present disclosure.

As illustrated in FIG. 1, a mold-clamping machine 10 is a horizontal type mold-clamping machine that includes a base 11, a stationary mount 13, a mold-clamping mechanism 15, a mold opening-and-closing mechanism 16, a movable mount 18, tie bars 19 and 19, and a constraining mechanism 30.

The stationary mount 13 is fastened on the base 11, and supports a stationary mold 12.

The mold-clamping mechanism 15 is placed in parallel with the stationary mount 13, and is supported by the base 11 so as to be freely movable horizontally. The mold-clamping mechanism 15 includes a piston rod 14 elongated toward the stationary mold 12.

The mold opening-and-closing mechanism 16 is for moving the mold-clamping mechanism 15 and the movable mount 18.

The movable mount 18 supports a movable mold 17. The movable mount 18 is placed between the stationary mount 13 and the mold-clamping mechanism 15, and is supported by the base 11 so as to be freely movable horizontally. The movable mount 18 is coupled to the piston rod 14.

The tie bars 19 and 19 extend horizontally from the stationary mount 13, and pass completely through the movable mount 18 and through the mold-clamping mechanism 15.

The constraining mechanism 30 is attached to the mold-clamping mechanism 15 so as to encircle the tie bars 19.

The mold-clamping mechanism 15 may be any of a hydraulic cylinder, a motor cylinder, and a toggle mechanism. The mold opening-and-closing mechanism 16 may be any of a hydraulic cylinder and a motor cylinder.

Moreover, the mold opening-and-closing mechanism 16 may be provided across the stationary mount 13 and the mold-clamping mechanism 15.

Furthermore, the mold opening-and-closing mechanism 16 may be provided across the base 11 and the movable mount 18 (or the mold-clamping mechanism 15).

For example, a slider 22 is mounted on a rail 21 laid over on the base 11, the movable mount 18 is mounted on the slider 22. By providing rollers like steel balls between the rail 21 and the slider 22, the movable mount 18 can be moved horizontally relative to the base 11 by slight force.

Still further, for example, the mold-clamping mechanism 15 may be directly mounted on a slider plate 23 bonded to a top face of the base 11 so as to allow the mold-clamping mechanism 15 to move horizontally relative to the base 11.

The present disclosure is not limited to the above schemes which mount the movable mount 18 on the slider plate 23 or which mounts the mold-clamping mechanism 15 on the rail 21 through the slider 22.

In order to ensure the length in the axial direction along the tie bar 19 (the area of the inner circumference surface), it is desirable that the constraining mechanism 30 should pass completely through the mold clamping mechanism 15 and through the movable mount 18, and have a tip protruding toward the stationary mount 13.

The constraining mechanism 30 includes, for example, flanges 31 provided at one-end side, a plurality of bolts 32 that fastens each flange 31 to the mold-clamping mechanism 82 16, and cylindrical portions 33 that extend along the respective tie bars 19 from the respective flanges 31. The cylindrical portions 38 encircle lengthwise sections of the respective tie bars 19 and, as shown in FIG. 1. are long enough to extend completely through the mold clamping mechanism 15.

Note that a male screw may be provided on the outer circumference surface of the cylindrical portion 33, a female screw may be provided on the mold-clamping mechanism 15, and the mold-clamping mechanism 15 may be coupled to the cylindrical portion 33 by screw-coupling. The screw-coupling scheme can eliminate the flanges 31 and the bolts 32.

Figure 2:
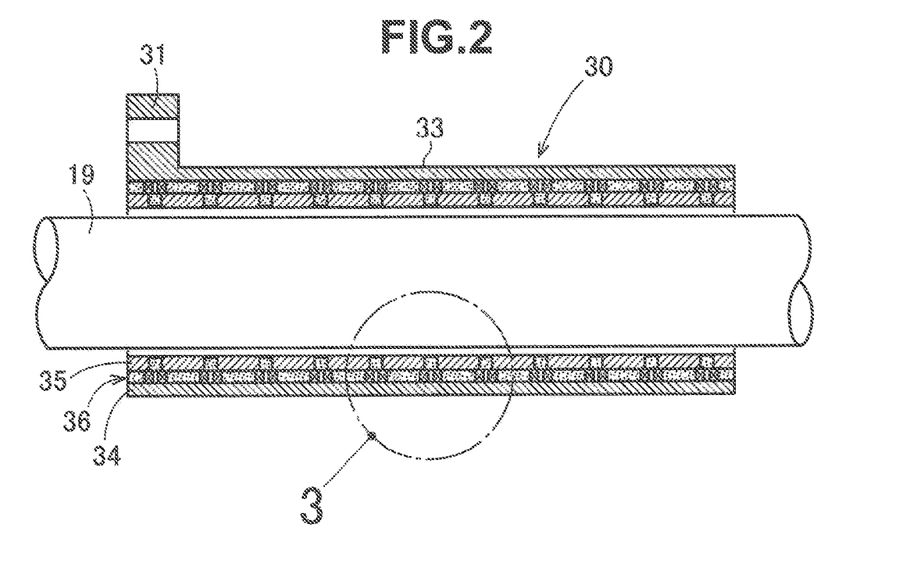
FIG. 2 is cross-sectional view of a constraining mechanism.

As illustrated in FIG. 2, the cylindrical portions 33 that extend from the respective flanges 31 are sufficiently long.

Figure 3:
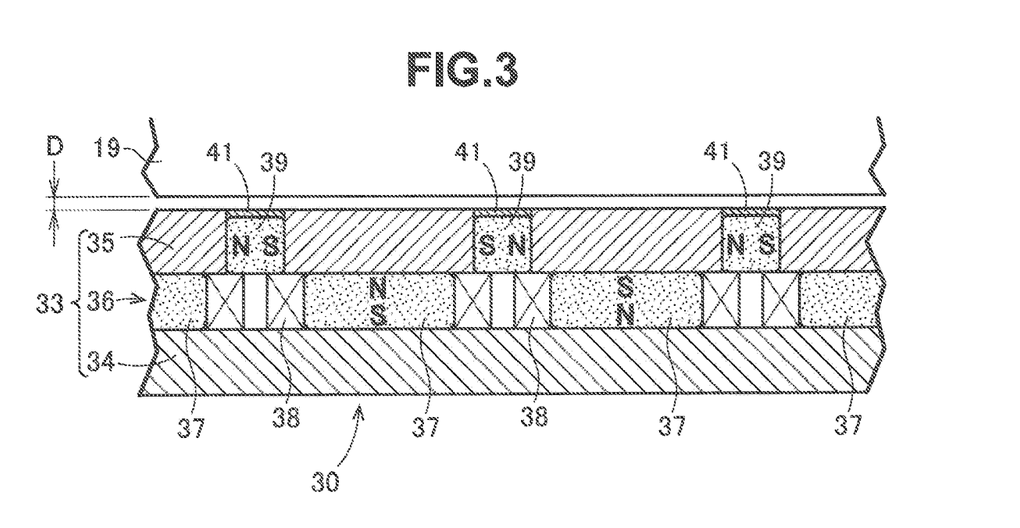
FIG. 3 is an enlarged view of a part 3 in FIG. 2.

As illustrated in FIG. 3, each cylindrical portion 33 includes, for example, an outer cylinder 34 formed of steel, an inner cylinder 35 formed of steel, and a magnet mechanism 36 placed between the outer cylinder 34 and the inner cylinder 35.

The magnet mechanism 36 includes, for example, a plurality of first permanent magnets 37 provided between the outer cylinder 34 and the inner cylinder 35, electro-magnetic coils 38 that surround the corresponding first permanent magnet 37, and a plurality of second permanent magnets 39 each provided between the adjoining electro-magnetic coils 38 and 38, and attached to the inner cylinder 35. The electro-magnetic coil 38 corresponds to an electric magnet.

An alnico magnet is suitable for each first permanent magnet 37. When a current flows through the electro-magnetic coils 38, the temperature of the respective first permanent magnets 37 inevitably rises. Since an alnico magnet has a Curie point temperature that is 860° C., it can withstand the temperature rise, and is suitable for magnetization inversion (that is to change the direction of magnetization).

Since the second permanent magnets 39 are not affected by the electro-magnetic coils 38, a neodymium (neodymium) magnet that has a Curie point temperature of 300° C. is applicable. The magnetic energy density of a neodymium magnet is 300 kJ/m$^3$ which is the magnetic property that is 7.5 times of the magnetic energy density of an alnico magnet which is 40 kJ/m$^3$, thus suitable for each second permanent magnet 39.

However, since a neodymium magnet is likely to be rusted, it is isolated from an ambient air by a water shielding film 41.

Moreover, the second permanent magnets 39 are placed in such a way that the N-pole of the one second permanent magnet 39 faces the N-pole of the adjoining second permanent magnet 39, and the S-pole of the one second permanent magnet 39 faces the S-pole of the adjoining second permanent magnet 39.

Actions of the constraining mechanism 30 that employs the above-described structure will be described below.

Figure 4A:
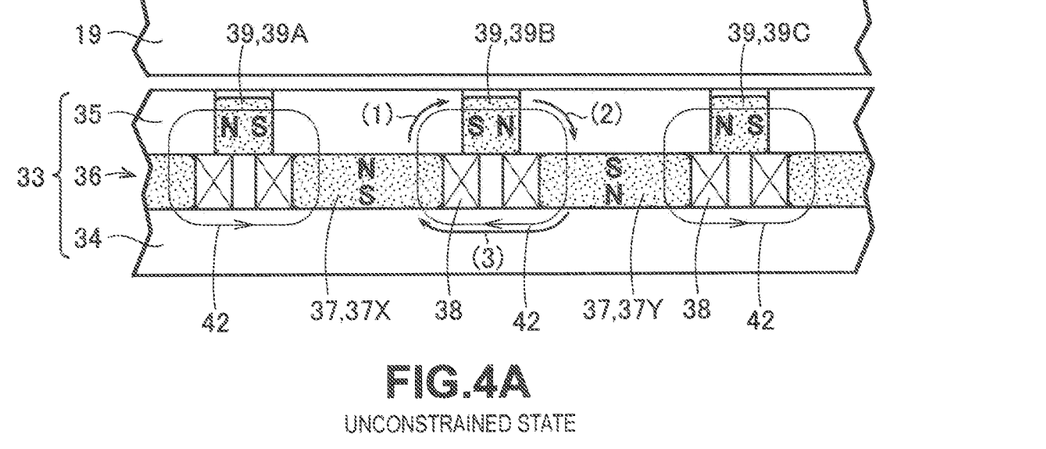
FIG. 4A is an action diagram for describing an unconstrained state.
Figure 4B:
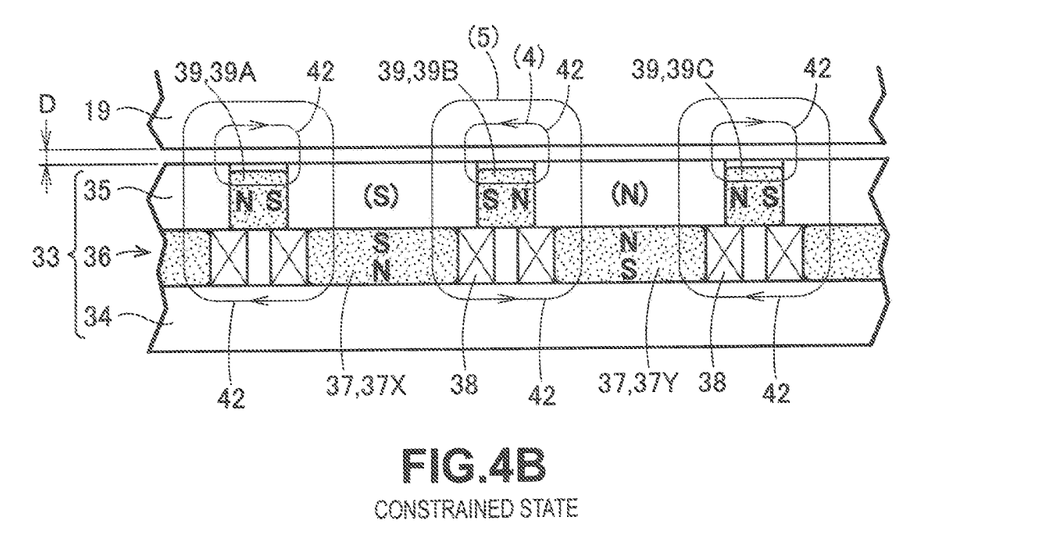
FIG. 4B is an action diagram for describing a constrained state.

In FIGS. 4 A and 4B, the second permanent magnets 39 will be referred to as second permanent magnets 39A, 39B, and 39C from the left side to the right side in the figure (A, B, and C are indices for distinguishing a position).

The first permanent magnet 37 located between the adjoining second permanent magnets 39A and 39B will be referred to as a first permanent magnet 37X, and the first permanent magnet 37 located between the adjoining second permanent magnets 39A and 39B will be referred to as a first permanent magnet 37Y.

As illustrated in FIG. 4A, the first permanent magnet 37X is placed in such a way that the top surface thereof is the N-pole and the bottom surface thereof is the S-pole, and the adjacent first next permanent magnet 37Y is placed in such a way that the top surface thereof is the S-pole, and the bottom surface thereof is the N-pole.

Since the magnetic field lines are drawn in the S-pole from the N-pole, as indicated by an arrow line (1), the magnetic field lines from the N-pole of the top surface of the first permanent magnet 37X are drawn in the S-pole of the nearest second permanent magnet 39B.

As indicated by an arrow line (2), the magnetic field lines from the N-pole of the second permanent magnet 39B are drawn in the S-pole of the nearest first permanent magnet 37Y.

As indicated by an arrow line (3), the magnetic field lines from the N-pole of the first permanent magnet 37Y are drawn in the S-pole of the nearest first permanent magnet 37X.

Consequently, at the center second permanent magnet 39B, magnetic field lines 42 in the clockwise direction in the figure are formed.

At the adjacent second permanent magnets 39A and 39C, magnetic field lines 42 in the counterclockwise direction in the figure are formed.

Since none of the magnetic field lines 42 is irrelevant to the tie bar 19, the cylindrical portion 33 is movable to the left side or to the right side in the figure relative to the corresponding tie bar 19. This state corresponds to an unconstrained state.

In order to make the cylindrical portion 33 into a constrained state relative to the tie bar 19, a current is caused to flow through the electro-magnetic coils 38 so as to invert the magnetization in such a way that the top surface of the first permanent magnet 37X becomes the S-pole and the bottom surface thereof becomes the N-pole. Similarly, the magnetization is inverted in such a way that the top surface of the adjacent first permanent magnet 37Y becomes the N-pole, and the bottom surface thereof becomes the S-pole.

As illustrated in FIG. 4 B, the first permanent magnet 37X and 37Y are subjected to the magnetization inversion. It is sufficient that a time for causing the current to flow for the magnetization inversion is less than one second.

The magnetic field lines 42 from the N-pole of the center second permanent magnet 39B reach the own S-pole via the nearest tie bar 19 like an arrow (4).

Moreover, the magnetic field lines 42 from the N-pole of the right first permanent magnet 37Y reach the S pole of the left first permanent magnet 37X via the tie bar 19 like an arrow (5).

Note that since the inner cylinder 35 formed of a steel becomes the N-pole and the S-pole, the inner cylinder 35 formed of a steel contributes to the formation and enhancement of the magnetic field lines 42.

Although the respective magnetic field lines 42 relating to the right and left second permanent magnets 39A and 39C are in the opposite directions, those still go through the tie bar 19.

Those magnetic field lines 42 causes the cylindrical portion 33 to be in the constrained state relative to the tie bar 19. In the constrained state, the cylindrical portion 33 does not move to the right side or to the left side in the figure.

When a current in the opposite direction is caused to flow through the electro-magnetic coils 38 for the magnetization inversion again, the state returns to FIG. 4 A.

Meanwhile, the constraint force in FIG. 4 B changes depending on a distance D between the cylindrical portion 33 and the tie bar 19. Such a change will be described in detail.

Figure 5:
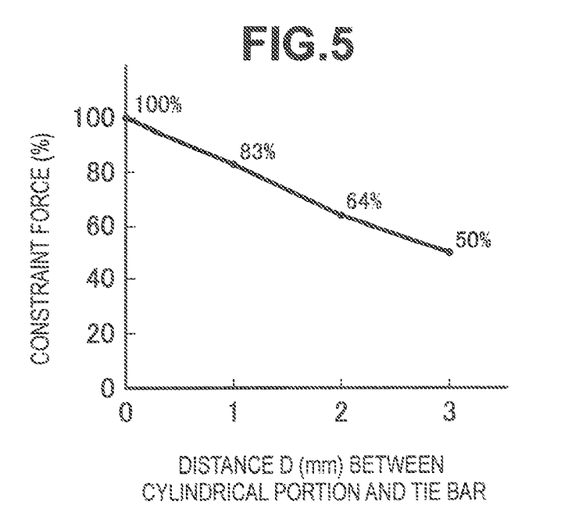
FIG. 5 is a graph illustrating a correlation between a distance from a cylindrical portion to a tie bar and constraint force.

The inventors of the present disclosure confirmed that, as illustrated in FIG. 5, with the distance D between the cylindrical portion 33 and the tie bar 19 being taken as a horizontal axis, constraint force with a gentle curve that goes down to the right side was obtained.

When it is defined that the constraint force when the distance D is 0 mm is 100%, the constraint force when the distance D was 1 mm was 83%, the constraint force when the distance D was in 2 mm was 64%, and the constraint force when the distance D was 3 mm was 50%.

Accordingly, if the distance D is several mm, a sufficient constraint force is ensured. Such a several mm will be defined as a predetermined distance.

By setting the distance D to be several mm, a mechanical contact between the cylindrical portion 33 and the tie bar 19 can be avoided, and thus a wear of the cylindrical portion 33 and also a wear of the tie bar 19 can be suppressed.

Next, actions of the mold-clamping machine 10 that includes the above-described constraining mechanism 30 will be described below.

In FIG. 1, the movable mold 17 is separated from the stationary mold 12. In order to accomplish the mold clamping, the constraining mechanism 30 is made into an unconstrained state, and the mold opening-and-closing mechanism 16 is compressed. This causes the movable mount 18 and the mold-clamping mechanism 15 to come close to the stationary mount 13. This causes the movable mold 17 to abut the stationary mold 12.

Next, the constraining mechanism 30 is made into a constrained state. Next, the mold-clamping mechanism 15 is expanded to clamp the movable mold 17 to the stationary mold 12 at high pressure.

A nozzle 45 of an injection apparatus 44 is caused to abut the stationary mold 12, and a melted resin is injected from the injection apparatus 44 into the stationary mold 12 and into the movable mold 17. After the resin material is cured, the constraining mechanism 30 is changed to the unconstrained state from the constrained state, and the mold is opened.

Next, a consumption amount of electrical energy will be discussed.

Assuming that the constrained state illustrated in FIG. 4B is maintained for, for example, 60 seconds, a current flows through the electro-magnetic coil 38 for one second and no current flows therethrough for 59 seconds. Hence, a current-carrying rate is calculated from 1÷60=0.017, and a current-carrying time remains only 1.7% of the total. The same is true of the case illustrated in FIG. 4A.

Therefore, according to this embodiment, an electrical energy consumption is quite little.

However, the magnet mechanism 36 that includes the first permanent magnet 37, the second permanent magnet 39, and the electro-magnetic coil 38 may be changed to a mere electrical magnet.

In the case of an electrical magnet, since the expensive permanent magnets 37 and 39 become unnecessary, the costs of the magnet mechanism 36 can be reduced. In the case of an electrical magnet, however, a current is continuously caused to flow therethrough during the constraint state, and thus the electrical energy consumption remarkably increases.

Therefore, in view of the electrical energy consumption, a permanent magnet is better than an electrical magnet.

Next, a modified example of the present disclosure will be described with reference to FIG. 6.

Figure 6:
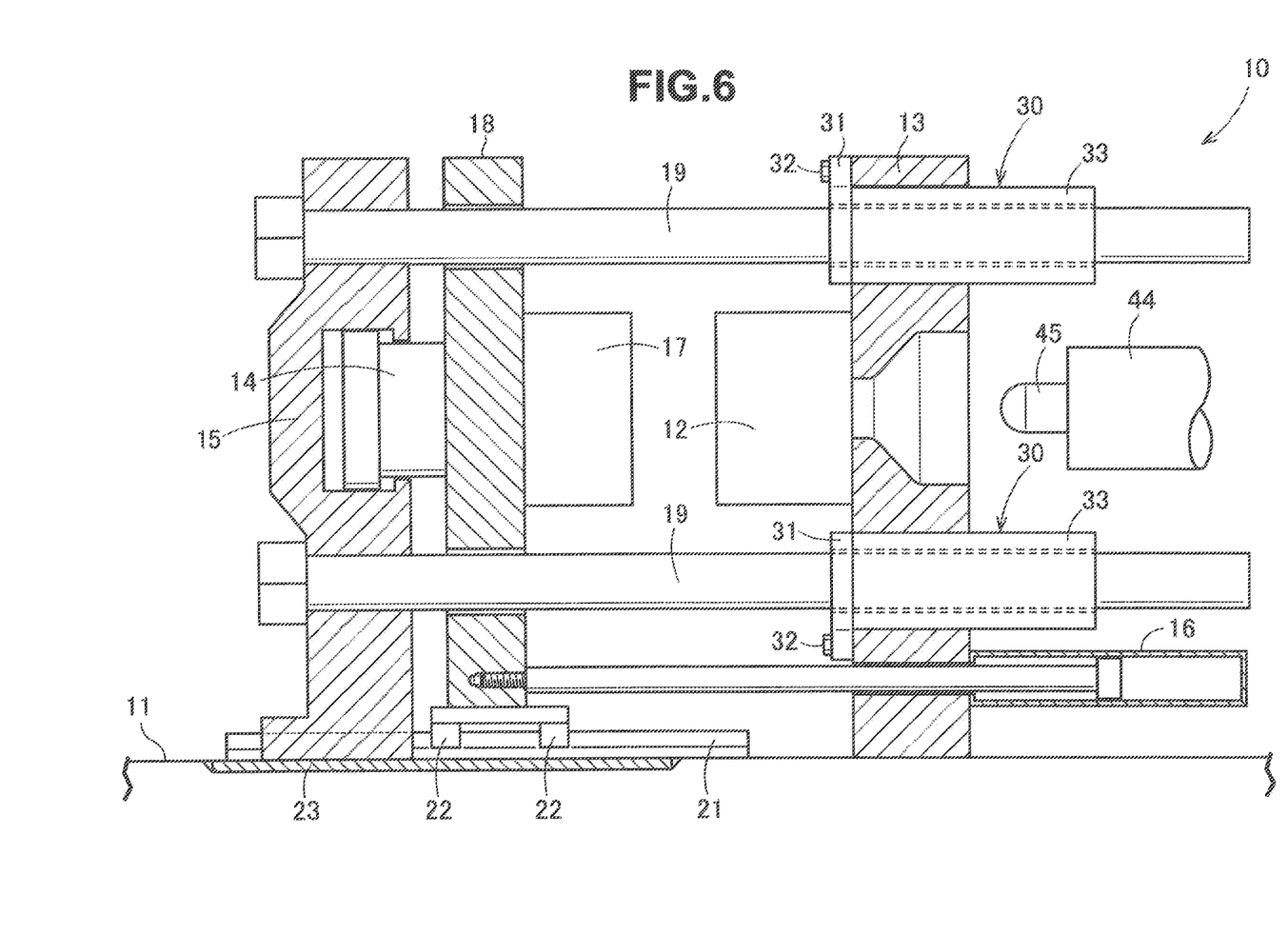
FIG. 6 is a side view of a mold-clamping machine according to a modified example of the present disclosure.

As illustrated in FIG. 6, the constraining mechanism 30 may be placed at the stationary-mount-13 side. The other structures are the same as those in FIG. 1, the same reference numeral as those in FIG. 1 are given, and the detailed description of the other structures will be omitted.

According to this constraining mechanism 30, the tips of the respective cylindrical portions 33 protrude from the stationary mount 13 toward the injection apparatus 44, and thus the sufficient length of each cylindrical portion 33 is ensured.

Note that unlike FIG. 6, the tip of each cylindrical portion 33 may protrude from the stationary mount 13 toward the movable mount 18. In view of the detachment work of the stationary mold 12, however, it is more preferable that the tip of each cylindrical portion 33 should protrude toward the injection apparatus 44 since a work space can be increased.

Moreover, although the horizontal type mold-clamping machine has been described in the embodiment, the present disclosure is also applicable to a vertical type mold-clamping machine.

INDUSTRIAL APPLICABILITY

The present disclosure is applicable to an alternative technology for conventional mold-clamping machines which utilize half nuts.

REFERENCE SIGN LIST

10 Mold-clamping machine
11 Base
12 Stationary mold
13 Stationary mount
15 Mold-clamping mechanism
16 Mold opening-and-closing mechanism
17 Movable mold
18 Movable mount
19 Tie bar
30 Constraining mechanism
33 Cylindrical portion
34 Outer cylinder
35 Inner cylinder
36 Magnet mechanism
37 First permanent magnet
38 Electro-magnetic coil
39 Second permanent magnet
42 Magnetic field lines
44 Injection apparatus
D Predetermined distance

The invention claimed is:

1. A mold-clamping machine comprising:
   a stationary mount which is fastened to a base and which supports a stationary mold;
   a movable mount which is mounted on the base so as to be movable and which supports movable mold;
   a mold clamping mechanism which is placed outwardly relative to the movable mount, is mounted on the base so as to be movable, and clamps th movable mold with the stationary mold;
   a lie bar that extends so as to pass completely through at least th movable mount;
   a mold opening-and-closing mechanism that moves either one of the movable mount or the mold-clamping mechan ism along the tie bar relative to the stationary mount; and
   a constraining mechanism that causes either one of the mold clamping mechanism or the stationary mount to be in a constrained state relative to the tie bar, the constraining mechanism comprising a cylindrical portion encircling a lengthwise section of the tie bar and extending completely through either one of the mold-clamping mechanism or the stationary mount, and a magnet mechanism disposed in a wall of the cylindrical portion and configured to megnetically cause either one of the mold-clamping mechanism or the stationary mount to be in the constrained state or in an enconstrained state relative to the tie bar.

2. The mold-clamping machine according to claim 1, wherein a predetermined distance is maintained between the cylindrical portion of the constraining mechanism and the tie bar.

3. The mold-clamping machine according to claim 1, wherein the magnet mechanism comprises: a first permanent magnet; an electro-magnetic coil that controls a polarity of the first permanent magnet; and a second permanent magnet.

4. The mold-clamping machine according to claim 2, wherein the magnet mechanism comprises a first permanent magnet; an electro-magnetic coil that controls a polarity of the first permanent magnet; and a second permanent magnet.

5. The mold-clamping machine according to claim 4, wherein the constraining mechanism further comprises a tip protruding from the movable mount toward he stationary mount.

6. The mold-clamping machine according to claim 4, wherein the constraining mechanism further comprises a tip protruding from the movable mount toward an injection apparatus.

7. The mold-clamping machine according to claim 3, wherein the constraining mechanism further comprises a tip protruding from the movable mount toward the stationary mount.

8. The mold-clamping mac ir e according to claim 2, wherein the constraining mechanism further comprises a tip protruding from the movable mount toward the stationary mount.

9. The mold-clamping machine according to claim 1, wherein the cylindrical portion of the constraining mechanism extends completely through the movable mount and has a tip protruding from the movable mount toward the stationary mount.

10. The mold-clamping ma ording to claim 3, wherein the cylindrical portion constraining mechanism extends completely through the stationary mount and has a tip protruding from the stationary mount toward an injection apparatus.

11. The mold-clamping machine according to claim 2, wherein the cylindrical portion of the constraining mechanism extends completely through the stationary mount and has a tip protruding from the stationary mount toward an injection apparatus.

12. The mold-clamping machine according to claim 1, wherein the cylindrical portion of the constraining mechanism extends completely through the stationary mount and has a tip protruding from the stationary mount toward an injection apparatus.

* * * * *